United States Patent

Batistic

[19]

[11] Patent Number: 6,109,704
[45] Date of Patent: Aug. 29, 2000

[54] METHOD OF IMPROVING THE CONTROL BEHAVIOR OF A BRAKING SYSTEM

[75] Inventor: Ivica Batistic, Frankfurt am Main, Germany

[73] Assignee: ITT Manufacturing Enterprises, Inc., Wilmington, Del.

[21] Appl. No.: 09/043,817

[22] PCT Filed: Oct. 17, 1996

[86] PCT No.: PCT/EP96/04524

§ 371 Date: May 19, 1998

§ 102(e) Date: May 19, 1998

[87] PCT Pub. No.: WO97/14589

PCT Pub. Date: Apr. 24, 1997

[30] Foreign Application Priority Data

Oct. 17, 1995 [DE] Germany .......................... 195 38 545

[51] Int. Cl.⁷ .................................................. B60T 8/32
[52] U.S. Cl. .......................... 303/194; 303/196; 303/165
[58] Field of Search ............................. 303/194, 195, 303/196, DIG. 5, 154, 156, 167, 177, 185

[56] References Cited

U.S. PATENT DOCUMENTS

| 3,717,384 | 2/1973 | Harned ..................................... 303/194 |
| 4,701,855 | 10/1987 | Fennel ..................................... 303/195 |
| 5,040,120 | 8/1991 | Hoffmann ............................... 303/194 |
| 5,342,118 | 8/1994 | Kampfmann et al. ................... 303/194 |
| 5,418,724 | 5/1995 | Iiboshi ..................................... 303/196 |
| 5,627,755 | 5/1997 | Negrin ..................................... 303/195 |
| 5,707,121 | 1/1998 | Harris et al. ............................. 303/194 |

FOREIGN PATENT DOCUMENTS

| 0329071 | 8/1989 | European Pat. Off. . |
| 0330064 | 8/1989 | European Pat. Off. . |
| 2638403 | 10/1989 | France . |
| 2 044 045 | 3/1972 | Germany ............................... 303/195 |
| 2 054 645 | 5/1972 | Germany ............................... 303/195 |
| 3345729 | 6/1985 | Germany . |
| 4032506 | 4/1992 | Germany . |
| 4133238 | 4/1993 | Germany . |
| 4340442 | 6/1995 | Germany . |
| 403182865 | 8/1991 | Japan ..................................... 303/194 |
| 2 151 732 | 7/1985 | United Kingdom .................. 303/194 |
| 2 227 534 | 1/1990 | United Kingdom .................. 303/194 |
| 2227534 | 8/1990 | United Kingdom . |
| 95/26286 | 6/1994 | WIPO . |

*Primary Examiner*—Christopher P. Schwartz
*Attorney, Agent, or Firm*—Rader, Fishman & Grauer PLLC

[57] ABSTRACT

A method of improving the control behavior of a controlled brake system, wherein the rotational behavior of the individual vehicle wheels is measured and evaluated for determining control quantities, and wherein slip threshold values for the commencement of the control are predetermined, includes that the slip threshold of a wheel is increased for a predefined time interval as a function of the acceleration after preceding instability in order to suppress the effects of road surface irregularities. This increase may be carried out in two steps as a function of the exceeded acceleration limit values.

6 Claims, 2 Drawing Sheets

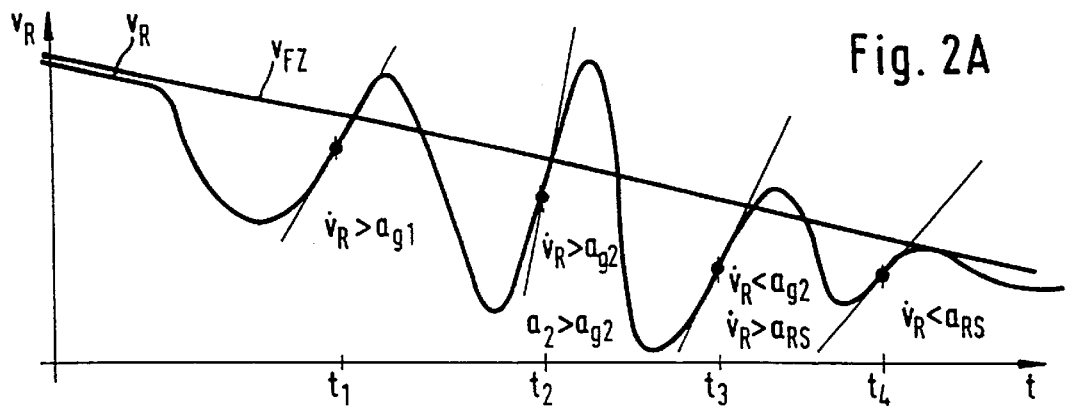
Fig. 2A
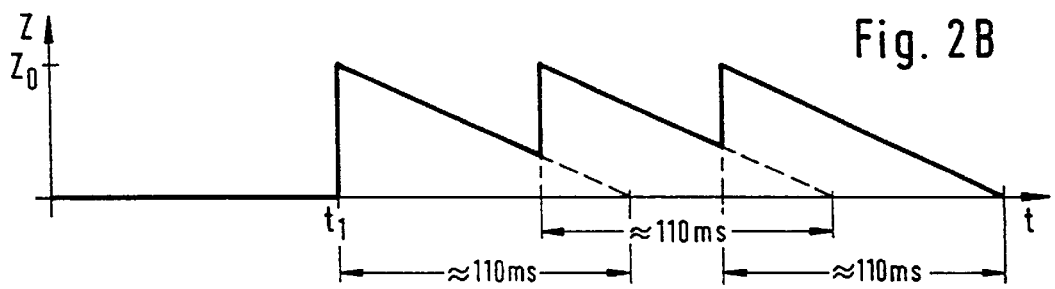
Fig. 2B
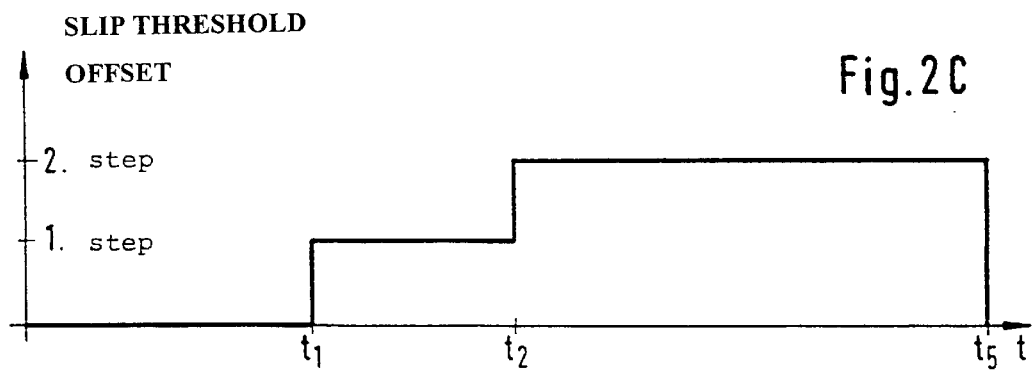
Fig. 2C
Fig. 2

METHOD OF IMPROVING THE CONTROL BEHAVIOR OF A BRAKING SYSTEM

BACKGROUND OF THE INVENTION

The present invention relates to a method of improving the control behavior of an anti-lock and/or traction-slip controlled brake system, wherein the rotational behavior of the individual wheels is measured and evaluated for determining a vehicle reference speed, the wheel slip, the deceleration and acceleration of the individual wheels and, if required, other control quantities, and wherein threshold values of the wheel slip are predefined for the commencement of the control.

Brake systems with electronic anti-lock control (ABS) are nowadays included in the standard equipment of a great number of automotive vehicles. Also, extension of the ABS to traction slip control is no rare occurrence. In systems of this type the rotational behavior of the individual wheels is measured by means of wheel sensors and evaluated by electronic circuits to generate the control quantities and braking pressure control signals. Among these control quantities which result from the wheel rotational behavior are mainly wheel slip, wheel speed, wheel deceleration and wheel acceleration and a so-called vehicle reference speed which is defined by logical combining of the individual wheel speeds.

Identifying the actual control situation from the data provided by the individual wheel sensors and the consistent controlling of the braking pressure for anti-lock control or traction slip control is always difficult when the interpretation of the rotational behavior of the wheels does not permit a definite indication of the instantaneous road situation and the vehicle behavior. Further, it is known that disturbances on the road surface or road surface irregularities of any type may cause misinformation of the controller or the evaluating circuit and undesirable control operations or variations in the control which have adverse effects on the control. This is because deceleration and acceleration actions or slip signals occur on the individual vehicle wheels due to the road disturbances which are interpreted by the controller as instabilities of the wheel run.

Road surface disturbances or irregularities of the above-mentioned type impair the ABS function. The ABS may even respond when the brake is not applied as soon as the ABS identification thresholds, which are slip or deceleration thresholds, are exceeded. When the brake is applied subsequently in the current ABS control, relatively great yaw torques may be caused which impair the driving stability of the vehicle. Also, the vehicle deceleration which is achievable in the given situation in an optimal braking operation will not be reached. Similar difficulties or discrepancies from the optimal behavior occur during traction slip control operations.

Therefore, an object of the present invention is to suppress the effects of various types of road irregularities on the control function of an ABS or TCS system and to thereby improve the control behavior of the ABS or TCS system. The objective is to achieve this improvement without disadvantages for the control sensitivity and control quality in other situations.

SUMMARY OF THE INVENTION

It has been found that this object is achieved by a method including that the slip threshold of a wheel is increased for a predetermined time interval as a function of the acceleration of the respective wheel after preceding instability. Appropriately, the slip threshold is increased proportionally to the acceleration of the wheel. The slip threshold rise is effected when the wheel acceleration exceeds a predetermined limit value. The method of the present invention is based on the idea that the wheel acceleration values after a preceding instability are not only due to the reduction of the brake torque. Rather, the values also depend on wheel load variations which influence the pressure modulation. There is even the imminent risk of the wheels losing their road contact under extreme conditions.

Under these conditions, deceleration (if one reacted in a conventional manner, i.e., by a corresponding pressure reduction) would depend on the arrangement of the disturbance values, or the irregularities on the road surface, and other coincidences. Therefore, according to the present invention, the sensitivity of the control is temporarily reduced by raising the threshold. The disturbances caused by road irregularities are thereby suppressed actively by an increased rate of brake torque. This is also advantageous in terms of achieving a short stopping distance.

In another aspect of the present invention, several acceleration limit values of a different magnitude are predefined, and the slip thresholds are stepwise increased as a function of the exceeding of the acceleration limit values. It has proved to be especially appropriate to predefine two acceleration limit values and to increase the slip thresholds by a predetermined, relatively low value when a first, low acceleration limit value is exceeded, and by a predetermined, comparatively high value when a second, higher acceleration limit value is exceeded.

The predetermined time intervals for the increase of the slip thresholds are in the order between 50 and 200 ms.

Further, according to the method of the present invention, the slip thresholds are reset after their increase or rise due to the exceeding of the predetermined acceleration limit values as soon as the acceleration of the wheel falls below a predetermined resetting threshold, or does not reach the acceleration threshold any more, upon expiry of the predetermined time interval. The level of the resetting threshold depends on the step or the value to which the slip threshold was raised. When the slip threshold, due to relatively significant disturbances or road irregularities, was raised to a comparatively high value, a relatively high resetting threshold applies. A low value for the resetting threshold rules when the road irregularities had caused only a relatively insignificant rise of the slip threshold.

Further features, advantages and possible applications of the present invention can be seen in the following description of further details, making reference to the accompanying drawings.

BRIEF DESCRIPTION OF THE DRAWINGS

In the drawings,

FIG. 2 is a diagram showing the speed of a wheel (FIG. 2A), the time variation of the increase (FIG. 2B) and the stepwise increase of the slip threshold (FIG. 2C) when the method of the present invention is employed.

DETAILED DESCRIPTION OF THE DRAWINGS

Figure 1:
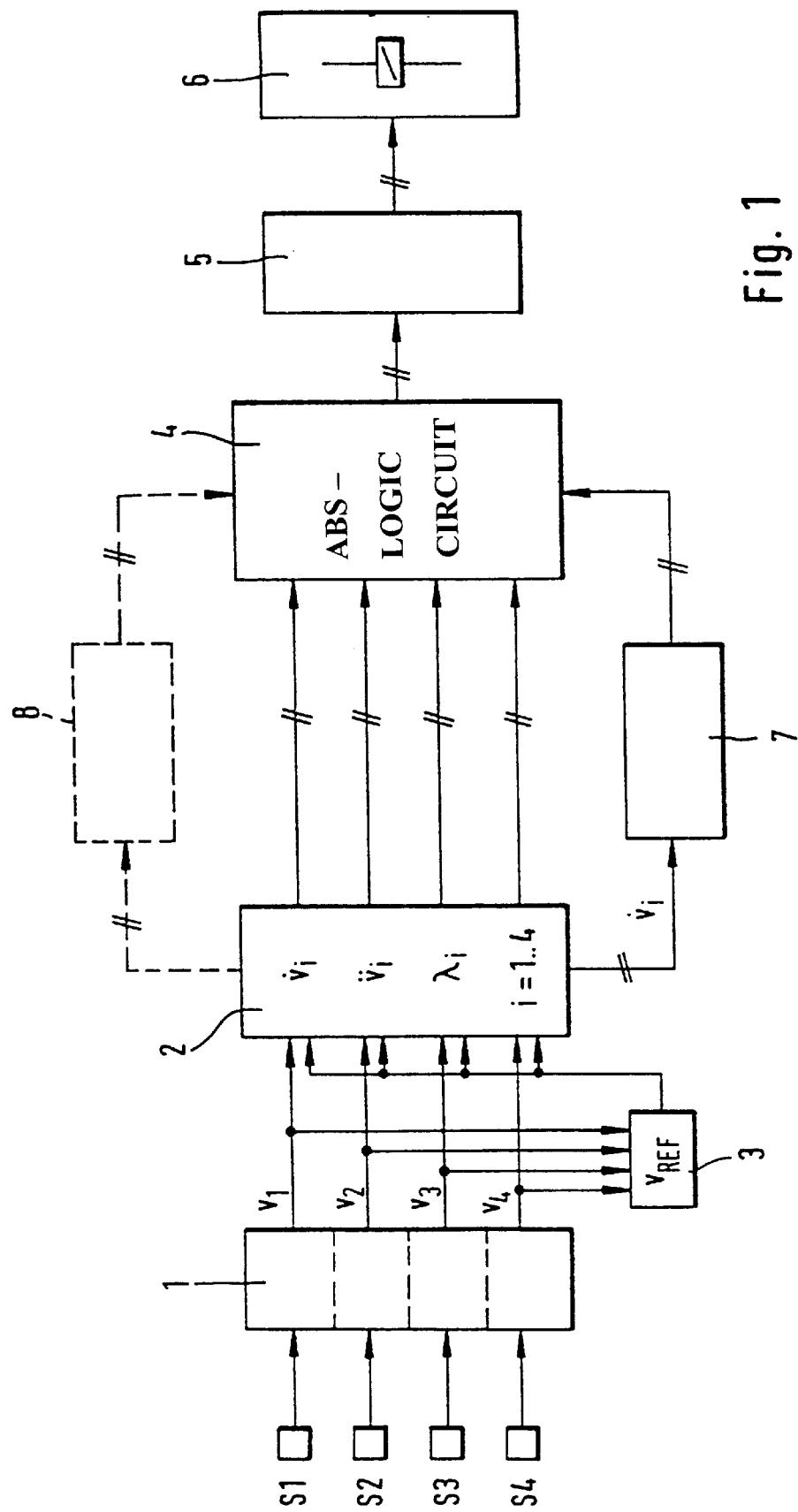
FIG. 1 is a schematically simplified block diagram view of a circuit for implementing the method of the present invention on an ABS.

The block circuit of FIG. 1 represents the main components of the electronic circuit of an electronically controlled ABS. The input signals of the control system are produced by wheel sensors S1 to S4 from which signals or data are derived in a conditioning circuit 1 that represent the speed variation $v_1$ to $v_4$ of the individual vehicle wheels. Mainly the first and second time derivative $\dot{v}_1$ to $\dot{v}_4$ and $\ddot{v}_1$ to $\ddot{v}_4$ is produced in an evaluating circuit 2, and the slip $\lambda_1$ to $\lambda_4$ of the individual wheels is calculated. As a reference quantity for this slip calculation a vehicle reference speed $v_{REF}$ corresponding approximately to the vehicle speed is required. The vehicle reference speed is determined in a circuit 3 by logically combining the individual speed signals $v_1$ to $v_4$.

In a circuit 4 which is represented as an ABS-logic circuit, braking pressure control signals are produced by data processing on the basis of complicated algorithms and by evaluating all data available from the values measured on each individual wheel and the derived values. The signals are sent by way of a valve actuation control 5 to a circuit block 6 which includes braking pressure actuators, for example, electromagnetically controllable hydraulic valves. It is, for example, known to assign an electrically or electromagnetically controllable inlet and outlet valve to each controlled vehicle wheel for braking pressure control and modulation.

Appropriately, ABS circuit systems of the type illustrated in FIG. 1 are realized by way of one or more microcomputers, microcontrollers, or similar means.

The additional components for implementing the method of the present invention are represented in FIG. 1 by an additional circuit 7 which is, of course, realized in a data processing system by corresponding program steps. In this circuit 7, the time derivatives $\dot{v}_1$ to $\dot{v}_4$, especially the reacceleration signals, of the individual vehicle wheels are analyzed. The index 'i' in FIG. 1 shows that the time derivative or the wheel acceleration $V_i$ for each wheel i (i=1 . . . 4) is produced and evaluated.

As will be described hereinbelow, the existence of disturbances, especially road irregularities, is concluded by way of circuit 7 from the magnitude of the acceleration or reacceleration of a wheel after preceding instability. To suppress the effects of such road irregularities on the control, the thresholds of commencement of the anti-lock control are varied as described by way of the diagrams shown in the FIG. 2 embodiment.

Another circuit 8 (shown in dotted lines) indicates the possibility of employing still further measures (realized by hardware or software) to improve the control, for example, when so-called bumps, road surface depressions or washboard roads occur, in a fashion which is known or has already been described in former applications.

The method of the present invention is basically appropriate for control systems with variable control commencement thresholds, especially variable slip thresholds. FIG. 2 relates to an example of a system of this type. FIGS. 2A to 2C are used to illustrate the operation of the method of the present invention. The diagram 'A' on the top illustrates the speed variation $v_R$ of a vehicle wheel during a control operation, wherein each phase of instability is followed by a relatively great reacceleration of the wheel. This wheel speed variation might be caused by road surface irregularities. The reacceleration of the wheel is analyzed according to the present invention. In the first case, at time t approximately, a comparatively great reacceleration $V_R=a_1$ is determined which exceeds a predetermined, relatively low acceleration limit value $a_{g1}$. At time $t_1$, therefore, a slip threshold which rules the commencement of the control is increased by a defined amount which is referred to as slip threshold 'offset', i.e., to the first step according to FIG. 2C. Unless other events occur, this increase applies for a predetermined time interval T, which is represented by the counter content Z (shown in FIG. 2B) which is reset after the start at time $t_1$ linearly within the time interval T. The acceleration value at time $t_1$ is shown in FIG. 2A by a tangent to the wheel speed curve $v_R$.

After the repeated instability and reacceleration of the wheel, the speed $v_R$ of which is shown, a reacceleration $v_R=a_2$ is determined at time $t_2$, still prior to the expiry of the predetermined time interval T. The reacceleration exceeds the reacceleration at time $t_1$ and a second, higher acceleration limit value $a_{g2}$. The result is an increase of the slip threshold related to this wheel by a still higher amount, i.e. a rise to the second step according to FIG. 2C. Further, the counter Z (FIG. 2B) is raised to the starting value $Z_0$ at time $t_2$ so that the counter which defines the time interval T is started again.

After a repeated wheel deceleration and reacceleration of the vehicle wheel R under review, a wheel acceleration $V_R=a_3$ is determined at time $t_3$ which is less than the acceleration at time $t_2$, however, is still in excess of a predetermined resetting limit value or in excess of a resetting threshold $a_{RS}$. Consequently, the rise of the slip threshold to the second step (see FIG. 2C) is maintained, and the counter (FIG. 2B) is started again.

At time $t_4$, the resetting threshold $a_{RS}$ falls below, whereupon on termination of the predetermined time interval T, related to the starting point $t_3$, the increase of the slip threshold is terminated at time $t_5$. Thus, the original sensitivity or the original slip threshold of the control system will predominate again.

Two different values apply for the resetting threshold $a_{RS}$ (which cannot be taken from the embodiment shown in FIGS. 2A to C, however). A top threshold value $a_{RS2}$ determines the removal of the slip threshold increase, provided that the second step of the slip threshold rise had been achieved before (see FIG. 2C). A second, lower resetting threshold $a_{RS1}$ which is below the lower acceleration limit value $a_{g1}$ comes into effect if previously the slip threshold had been increased to the first step and, subsequently, the reacceleration did not reach the slip threshold.

In a special embodiment, the following values were fixed for the acceleration limit values, the resetting thresholds and for the predetermined time interval T:

$a_{g1}$~7 g (6.5 . . . 7.7 g)

$a_{g2}$~9 g (8.5 . . . 9.5 g)

$a_{RS1}$~4 g (3.5 . . . 4.5 g)

$a_{RS2}$~6 g (5.5 . . . 6.5 g)

T~110 msec (5.0 . . . 200 msec)

'g' refers to the constant of acceleration due to gravity (g=9.81 m/s$^2$).

It is, of course, also possible to increase the slip threshold in more than two steps in dependence on the reacceleration of the respective vehicle wheel. On the other hand, it is deemed sufficient in many cases to provide one single step for the threshold rise.

Further, it may be expedient to provide different threshold offsets or threshold rise steps for the driven wheels and the non-driven wheels. This prevents that vibrations of the transmission line cause an unwanted threshold rise and, thus, a relatively insensitive control. The special increase values depend on the respective vehicle construction.

What is claimed is:

1. A method of improving the control behavior of an electronically controlled brake system, wherein the rotational behavior of individual vehicle wheels is measured and evaluated for determining a vehicle reference speed, wheel slip, wheel deceleration and acceleration, and, if required, other control quantities, wheel slip threshold values being predefined for the commencement of a control, the wheel slip threshold being increased for a predetermined time interval as a function of the wheel acceleration after preceding instability of the respective wheel, the wheel slip threshold rise being effected when predetermined limit values of wheel acceleration are exceeded wherein several acceleration limit values of a different magnitude are predefined, and wherein the wheel slip threshold is stepwise increased as a function of the excess of the acceleration limit values.

2. A method as claimed in claim 1, wherein two acceleration limit values are predetermined, and wherein the slip threshold is increased by a predetermined, relatively low value in a first step when a first, low acceleration limit value is exceeded, and by a predetermined, comparatively higher value in a second step when a second, higher acceleration limit value is exceeded.

3. A method as claimed in claim 1, wherein the predetermined time interval for the increase of the slip threshold is in the order between 50 and 200 msec.

4. A method of improving the control behavior of an electronically controlled brake system, wherein the rotational behavior of individual vehicle wheels is measured and evaluated for determining a vehicle reference speed, wheel slip, wheel deceleration and acceleration, and, if required, other control quantities, wheel slip threshold values being predefined for the commencement of a control, the wheel slip threshold being increased for a predetermined time interval as a function of the wheel acceleration after preceding instability of the respective wheel, the wheel slip threshold rise being effected when predetermined limit values of wheel acceleration are exceeded, wherein the slip threshold, which was increased due to an excess of the predetermined acceleration limit value, is reset as soon as the acceleration of the wheel falls below a predetermined resetting threshold upon expiry of the predetermined time interval.

5. A method as claimed in claim 4, wherein the level of the resetting threshold depends on the value to which the slip threshold was raised.

6. A method as claimed in claim 4, wherein the predetermined time interval for the increase of the slip threshold is in the order between 50 and 200 ms.

* * * * *